July 6, 1926.  
J. F. STEPHENS  
COTTON PLANTER  
Filed March 21, 1925  
1,591,793  
2 Sheets-Sheet 2
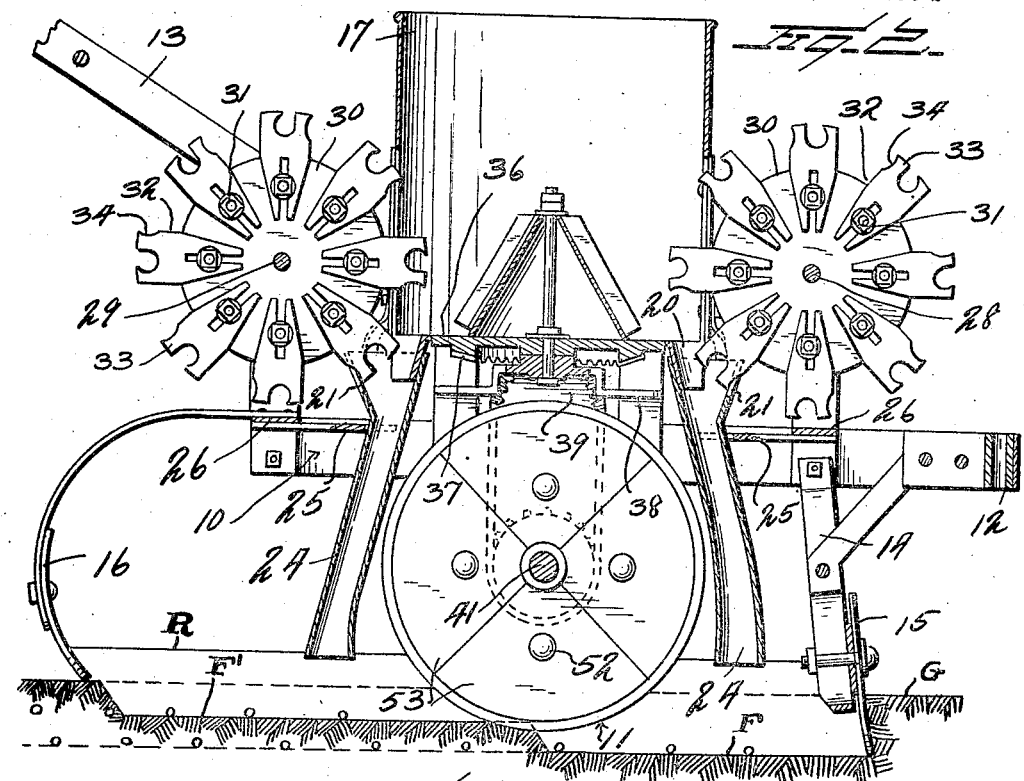
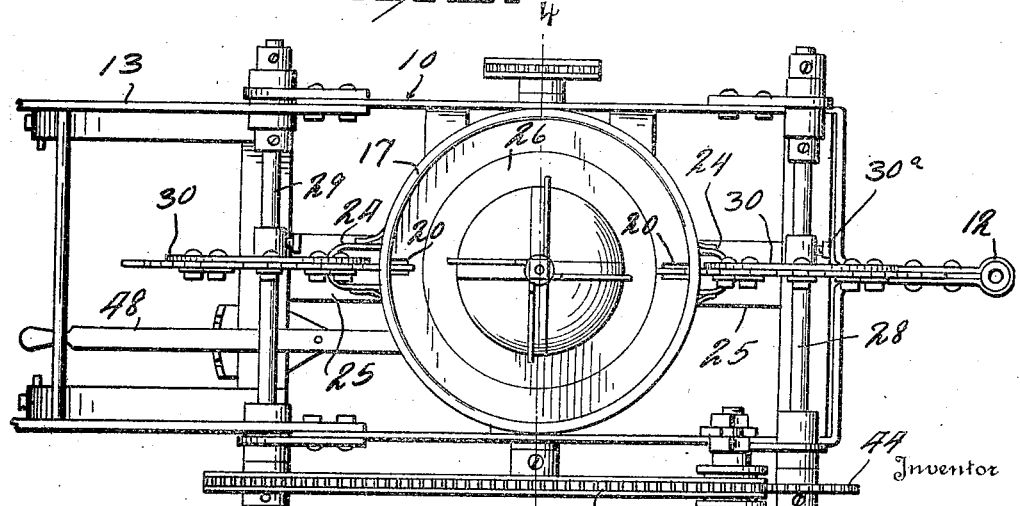
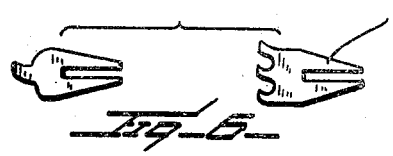
Inventor  
J. F. Stephens  
By Watson E. Coleman  
Attorney Patented July 6, 1926.

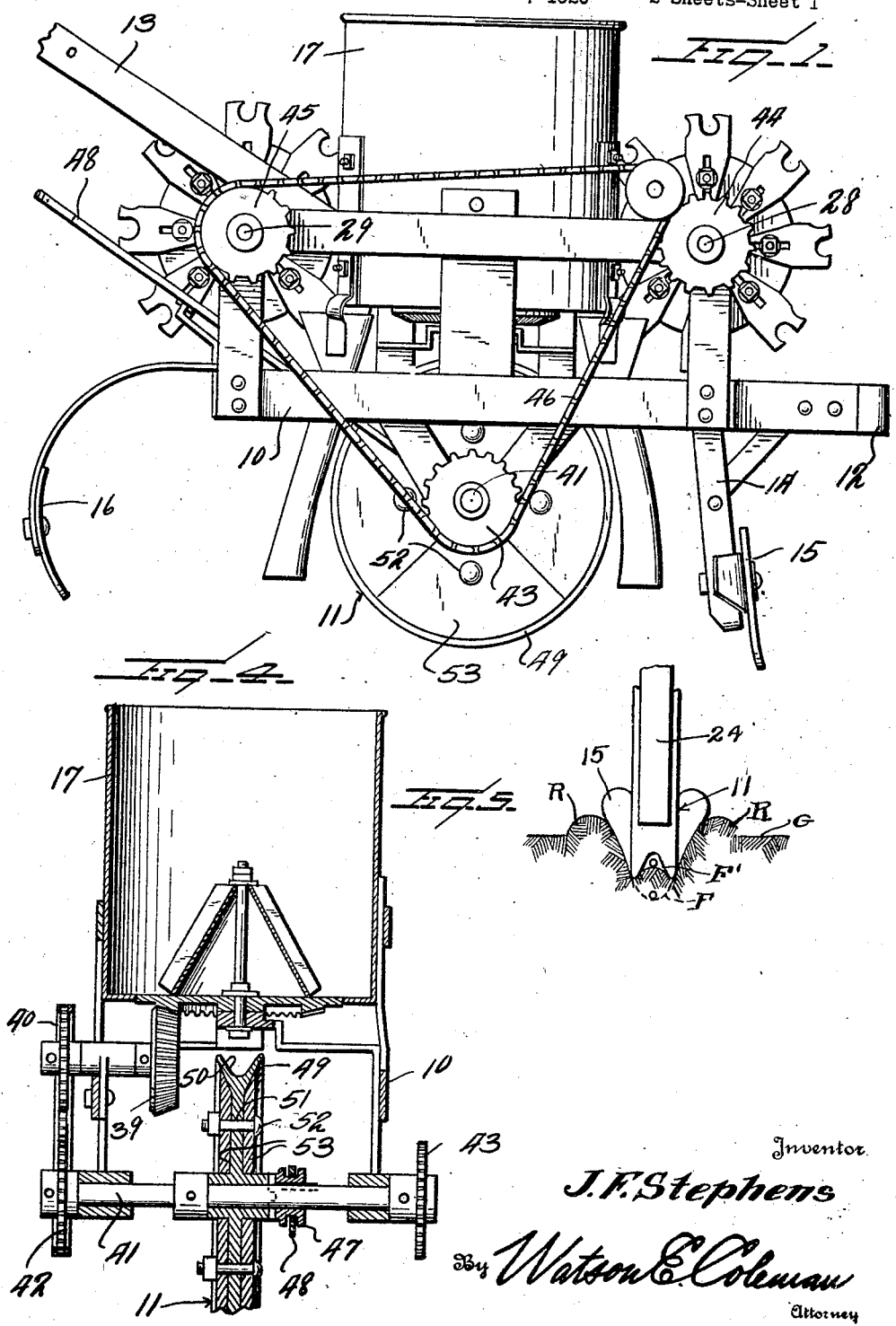

1,591,793

UNITED STATES PATENT OFFICE.

JAMES F. STEPHENS, OF NEWBERRY, SOUTH CAROLINA, ASSIGNOR OF ONE-HALF TO NATHANIEL GIST, OF NEWBERRY, SOUTH CAROLINA.

COTTON PLANTER.

Application filed March 21, 1925. Serial No. 17,346.

This invention relates to improvements in cotton seed planters and has for an important object thereof a device of this character which is capable of a maximum adjustment in planting thereby enabling a single machine to accomplish all of the work necessary in cotton planting.

I have found that in cotton planting, the only method of securing, with any degree of certainty, a proper stand is to employ what is known as double depth planting, that is to say, a planting where two groups of seeds are planted in the same row, one at a lower and another at a higher level. If the season be dry, the lower level will supply the stand while if the season is wet, the upper level supplies the stand. A planter for accomplishing this purpose is shown in my prior application, Serial No. 693,334, filed February 16, 1924, for improvements in cotton seed planters.

An important object of this invention is the improvement of this planter so that in addition to affording the double planting, it is suitable for use in soils of various consistencies and so that the planting at each depth may be very finely regulated. This is necessary due to the fact that often in planting, it will be apparent that the on-coming season will be the wet or dry in which event, it is desirable that the seeds planted at the depth that it will not supply the stand be either completely discontinued in planting or planted at fairly long intervals. To this end, the seed feeding means disclosed in my prior application has been modified so that the picker teeth of this feeding means may be increased or decreased in number at will or either of the picker wheels rendered inoperative at will.

A further object of the invention is to provide means for readily controlling the weight of the planter, it being understood that this weight acts to control the depth at which the relatively deep stand is embedded. A planter of a given weight on a soil of given consistency will embed the seeds at the proper depth while the lighter soils would embed the seed too deeply and on heavier soils would not embed the seeds sufficiently.

A further and more specific object of the invention is to provide a planter having a land wheel so constructed that it serves both to cover and embed the deeper planting of the seed and which is adjustable as to weight to thereby adjustably control the weight of the planter as a whole.

These and other objects I attain by the construction shown in the accompanying drawings, wherein for the purpose of illustration is shown a preferred embodiment of my invention and wherein:—

Figure 1 is a side elevation of a planter constructed in accordance with my invention;

Figure 2 is a longitudinal sectional view therethrough;

Figure 3 is a plan view thereof;

Figure 4 is a section on the line 4—4 of Figure 3;

Figure 5 is a rear sectional view taken through a furrow immediately in advance of the closers 16 and looking forwardly;

Figure 6 is a combined detailed view showing modifications of the picker teeth elements to provide a smaller or larger number of picker teeth.

Referring now more particularly to the drawings, the numeral 10 indicates a frame supported centrally from a land wheel 11. This frame has at its forward end means, as at 12, whereby it may be attached to a draft appliance and at its rear end handles 13, by means of which it may be guided. Below the frame and supported therefrom at the lower forward end is arranged a suitably braced support 14 having a furrow opening blade 15 of greater width than the land wheel vertically adjustable thereon and which the land wheel 11 tracks. At its rear end, the frame has depending therefrom furrow closers 16 engaging the soil at opposite sides of the furrow to return it to the furrow in the usual manner.

Arranged upon the frame centrally thereof is a hopper 17 which is formed at the longitudinal center of the machine with vertically extending slots 18 opening through its side walls and through the adjacent portions of the bottom wall thereof. Mounted upon the walls of the hopper at opposite sides of each slot 18 are adjustable slides 19 which may be shifted to regulate the size of the opening represented by the slots 18. Those portions of the slots opening through the bottom 20 of the hopper have formed thereabout a short spout 21 which is downwardly directed and has its rear wall open. Secured to the hopper by means of supporting straps 22 engaged with the lower securing elements 23 of the plates 19 are seed boots 24 extending downwardly at opposite sides of the land wheel, one directly in advance of the land wheel and the other directly in the rear of the land wheel. These spouts are steadied and rigidified by braces 25 extending from a cross brace 26 of the frame.

At opposite sides of the hopper and supported from the frame are shafts 28 and 29 to each of which is secured a disk 30. The disks 30 have hubs engaging the shafts and provided with set-screws 30ª for holding the disks against rotation so that these disks may be freed from rotation with the shaft at any time which may be found desirable. To these disks are removably secured by securing elements 31 picker teeth carrying members 32 having teeth 33, the forward surfaces of which are formed so that the teeth are hooked, as at 34, and will readily engage and remove cotton seed which have been poorly ginned. This is necessary due to the fact that the lint remaining upon such cotton seed will tend to interlock with the lint of other cotton seed and render removal from the hopper difficult. This member 32 may have any desired number of teeth. In Figures 1 and 2, these members are shown as having two teeth while in Figure 7, I have illustrated members which may be substituted having one and three teeth.

It will, of course, be understood that the number of teeth together with the number of members 32 which are applied to the wheel will control the amount of seed which are fed through the boots. If the three tooth elements 32, as illustrated in Figures 7, are employed and eight of these elements are used, as shown on each wheel, the result will be a substantial "drilling" of the seed in each stand. If the three tooth elements and a full complement of elements be employed at the forward wheel and the rear wheel be provided with a single tooth element and a full complement, approximately one-third of seed will be fed to the shallow stand and that so fed through the forward spout of the deep stand. These conditions reversed, a heavy drilling is provided in the shallow stand while but a small number of seed are fed to the deep stand. In order that removal and application of the picker members 32 may be facilitated, each picker member is provided in the shank thereof with a longitudinally extending slot 35 through which the shank of the securing element may extend.

Means are provided for agitating the contents of the hopper including a rotatable bottom section for the hopper, indicated at 36, which is formed upon its lower surface with a bevel gear wheel 37. This rotatable bottom section is suitably supported from the frame as by a bracket 38 and meshes with a bevel gear wheel 39 mounted on the stub shaft carried by the frame and having at its outer end a sprocket wheel 40. Carried by the axle 41, upon which the land wheel 11 is mounted is a second sprocket wheel 42 connected with the sprocket wheel 40 by a chain 43. Upon the opposite end of the axle is a sprocket wheel 43 driving a chain 46 engaging the sprocket wheels 44 and 45 carried by the shafts 28 and 29 in such manner that these shafts are driven in opposite directions and each operate to bring the picker teeth of the disk thereof into the slots 18 at the upper end of these slots for movement downwardly through the slots and a partial projection into the hopper. The land wheel 11 is loosely mounted on the axle and is affixed thereto as desired by a clutch 47 controlled from an operating arm 48 projecting adjacent the handles 13.

This land wheel is in the form of a thin disk 48, the outer edge of which is split to provide diverging flanges 49 providing in the outer surface of the wheel a V-shaped groove 50. At circumferentially spaced points, the disk is formed with openings 51 for the passage of securing elements 52 by means of which counter-weights 53 may be secured to opposite faces of the wheel to thereby control the weight of the land wheel and the total weight of the planter. By applying or removing a given number of the weights 53 any desired weight may be had, thus assuring proper depth in the planting of the deep seed row. The openings 51 are arranged in diametrically opposed pairs so that a proper balance of the land wheel may be had at all times. The weights are so constructed that they do not extend to the edges of the diverging flanges 49 leaving a portion of these flanges exposed. Such a wheel in passing over the ground will sink into the ground firmly pressing down the deep stand fed through the forward spout and these flanges cutting into the ground will disturb the soil, causing a portion thereof to fall into the furrow behind the land wheel to thereby properly cover the deep stand before the shallow stand is dropped into this furrow. The operation effected is best illustrated in Figures 2 and 5. In these figures, G designates the ground line and F the bottom of the furrow formed by the furrow opener 15, this furrow opener being of greater width than the land wheel. The land wheel tracks in the furrow, as differentiated from on the furrow, with the result that the furrow is only partially filled by the land wheel so that the depth of the furrow is reduced to a level indicated by the line F'. Upon this level, the seeds from the rear boot are deposited and the furrow finally filled by the closer 16 which would turn the ridges R produced in the formation of the furrow to the furrow.

It will be obvious that if desired, nitrate of soda or similar fertilizer may be mingled with the seeds contained within the hopper and will be fed into the stands in the proportion in which the seeds are fed to these stands. If but a single stand is being planted, all of the fertilizer will be fed to that stand and if two stands are being planted with unequal amounts of seed, the fertilizer will be properly proportioned to each stand.

It will be obvious that the structure hereinbefore set forth is capable of a certain range of change and modification without in any manner departing from the spirit of my invention and I accordingly do not limit myself to such specific structure except as hereinafter claimed.

I claim:—

A planter embodying a frame, a land wheel supporting the frame centrally thereof, a furrow opener of greater width than the land wheel in advance of the land wheel and in the furrow of which the land wheel tracks, furrow closers carried by the rear end of the frame, a seed hopper carried by the frame, seed boots leading downwardly from the hopper, one between the furrow opener and the land wheel, the other between the land wheel and the furrow closers and means for feeding seed from the hopper to said boots independently adjustable to regulate the amount of seed fed through the associated boot or to discontinue the feed of seed through such boot.

In testimony whereof I hereunto affix my signature.

JAMES F. STEPHENS.